United States Patent [19]

Sakakima et al.

[11] Patent Number: 5,049,209

[45] Date of Patent: * Sep. 17, 1991

[54] MAGNETIC NITRIDE FILM

[75] Inventors: Hiroshi Sakakima, Hirakata; Koichi Osano, Neyagawa; Yuji Omata, Ibaraki; Mitsuo Satomi, Katano; Koichi Kugimiya, Toyonaka, all of Japan

[73] Assignee: Matsushita Electric Industrial Co., Ltd., Kadoma, Japan

[*] Notice: The portion of the term of this patent subsequent to Jun. 6, 2006 has been disclaimed.

[21] Appl. No.: 445,105

[22] Filed: Dec. 7, 1989

Related U.S. Application Data

[63] Continuation of Ser. No. 279,715, Dec. 5, 1988, abandoned, which is a continuation of Ser. No. 24,141, Mar. 10, 1987, Pat. No. 4,836,865.

[30] Foreign Application Priority Data

Mar. 12, 1986 [JP] Japan .................................. 61-54054
Aug. 26, 1986 [JP] Japan ................................ 61-199631

[51] Int. Cl.[5] ............................................. H01F 10/12
[52] U.S. Cl. .................................... 148/306; 148/312; 148/313; 148/314
[58] Field of Search ............... 148/306, 312, 313, 314, 148/317, 318; 420/128, 435, 436

[56] References Cited

U.S. PATENT DOCUMENTS

| 3,567,525 | 3/1971 | Graham et al. | 148/306 |
| 4,231,816 | 11/1980 | Cuomo et al. | 204/192.2 |
| 4,623,408 | 11/1986 | Karamon et al. | 420/128 |
| 4,663,193 | 5/1987 | Budo et al. | 204/192.2 |
| 4,707,417 | 11/1987 | Hayakawa et al. | 428/611 |
| 4,836,865 | 6/1989 | Sakakima et al. | 148/306 |
| 4,969,962 | 11/1990 | Watanabe et al. | 148/306 |

FOREIGN PATENT DOCUMENTS

| 288316 | 10/1988 | European Pat. Off. | 148/306 |
| 285406 | 12/1987 | Japan | 204/192.2 |

OTHER PUBLICATIONS

IEEE Transactions on Magnetics, vol. MAG-21 (1985), pp. 1432-1434.
VDI-Journal, vol. 123 (1981), pp. 519-525.
IBM Tech. Discl. Bull. 20 (1978), p. 4964.

Primary Examiner—R. Dean
Assistant Examiner—George Wyszomierski
Attorney, Agent, or Firm—Cushman, Darby & Cushman

[57] ABSTRACT

The disclosed magnetic nitride T-M-N film (T is at least one metal selected from the group consisting of Fe, Co, Ni and Mn; M is at least one metal selected from the group consisting of Nb, Zr, Ti, Ta, Hf, Cr, W and Mo; N is nitrogen (N)) has excellent wear resistance and high electric resistivity, and the compositionally modulated nitride film shows a soft magnetic property, as well as thermal stability of the properties.

1 Claim, 6 Drawing Sheets

Before annealing ⟶ After annealing

MAGNETIC NITRIDE FILM

This is a continuation of application Ser. No. 07/279,715, filed 12/5/88, which was abandoned upon the filing hereof; which is Cont. of Ser. No. 07/024,141, filed Mar. 10, 1987, now U.S. Pat. No. 4,836,865.

FIELD OF THE INVENTION AND RELATED ART STATEMENT

1. FIELD OF THE INVENTION

The present invention relates generally to a soft magnetic nitride film, and more particularly, to a soft magnetic nitride film suitable for use as a magnetic head or the like.

2. DESCRIPTION OF THE RELATED ART

Heretofore, there have been attempts to produce magnetic alloy films containing nitrogen (N) by $N_2$ reactive sputtering or by sputtering using a nitride target. For example, a nitride alloy film made of Fe, Co, Ni and glass-forming elements such as B, Si, Al, P, and C (shown in Japanese published unexamined patent application Nos. Sho 54-94428 and 60-15261) and an iron nitride film (shown in the *Journal of Applied Physics (J. Appl. Phys.)* 53(11), 8332(1982)) are well known. In the case of the former, for example, in a nitride Fe-B-N film made by nitrifying Fe-B alloy, the perpendicular magnetic anisotropy increases, and accordingly, the soft magnetic property of the Fe-B alloy deteriorates. At the same time, the saturation magnetization (hereinafter referred to a the value of $4\pi Ms$) decreases by the nitriding thereof. On the other hand, in the case of the Fe-N film of the latter, when the N content in the Fe-N film is small, the value of $4\pi Ms$ increases, but the coercive force, Hc, is large, and accordingly, the Fe-N film does not exhibit a soft magnetic property. Accordingly, at the present time, the hard magnetism of the Fe-N film draws more attention than the soft magnetism thereof, and research for applying it to a recording media has proceeded.

OBJECT AND SUMMARY OF THE INVENTION

The present invention is intended to solve the above-mentioned problems, and to provide a magnetic nitride film which has a small coercive force, Hc, soft magnetism, thermal stability of the characteristic, high wear resistance and the very high electric resistivity which is proper to a nitride.

The magnetic nitride film of the present invention is represented by the formula:

$$T_X M_Y N_Z \ldots \quad (1)$$

wherein,

T is at least one metal selected from the group consisting of Fe, Co, Ni and Mn; M is at least one metal selected from the group consisting of Nb, Zr, Ti, Ta, Hf, Cr, W and Mo; N is elemental nigrogen, and X, Y and Z show the atomic percent of T, M and N, respectively, and the values of X, Y and Z are defined by the following expressions:

$$\left.\begin{array}{l} 75 \leqq X < 94 \\ 6 \leqq Y < 25 \\ 0.1 \leqq Z \leqq 20 \\ X + Y + Z = 100 \end{array}\right\} \quad (2)$$

Although a film having the composition indicated by the above-mentioned formula (1) is a nitride, when the value of Z is defined by expression (3), $$Z \leqq 20 \ldots \quad (3)$$

deterioration of the value of $4\pi Ms$ is negligibly small in comparison with a non-nitride alloy film (i.e., Z=0), and furthermore, when the nitrogen content of the film is in this range, as the nitrogen content increases, the value of $4\pi Ms$, increases. Moreover, even with nitriding, when the elemental nitrogen (N) content is in the range given by expression (3), deterioration of the soft magnetic property of the nitride film is smaller than in conventional nitride film. In order to improve wear resistance by nitriding, a composition defined by expression (4) is required:

$$0.1 \leqq Z \ldots \quad (4).$$

In order to attain an excellent soft magnetic property, a requirement defined by expression (5) must be satisfied:

$$6 \leqq Y \text{ (i.e., } X < 94) \ldots (5).$$

When it is intended to apply the magnetic nitride film to a magnetic head, in order to realize $4\pi Ms \geqq 5000$ Gauss, a condition defined by expression (6) is required:

$$75 \leqq X \text{ (i.e., } Y < 25) \ldots (6).$$

Moreover, a multilayered film is obtained by alternately laminating the magnetic nitride film and the non-nitride alloy film shown by expression (7):

$$T_{X'} M_{Y'} \ (X' + Y' = 100, 75 \leqq X' < 94, 6 < Y' < 25) \ldots (7).$$

This multilayered film shows excellent wear resistance and a satisfactory soft magnetic property. When the condition that $t \leqq 1000$ Å is satisfied (t is the thickness of one layer), the magnetic layered film shows remarkable effects based on the multilayer configuration, such that partial wear between $T_X M_Y N_Z$ film and $T_{Y} M_{Y}$ film is hardly observed, and an excellent soft magnetic property is obtained.

That is, the soft magnetic property, which is liable to be damaged by nitrifying, is retained by the alternate lamination of the magnetic nitride film and the amorphous alloy film (e.g., U.S. Pat. No. 4,437,912) which is designated by expression (7) and which has an excellent soft magnetic property.

The multilayered film obtained in this way shows an excellent soft magnetic property in its prepared state. However, when it is annealed at about 300° C., the excellent soft magnetism deteriorates due to the interdiffusion of elemental nitrogen (N) between the layers.

Such thermal instability can be improved when the multilayered film is formed into a compositionally modulated film shown by expression (8) below by high temperature annealing. When it is used at a temperature lower than the annealing temperature, the soft magnetic property is stable.

The compositionally modulated film, which is obtained by annealing a multilayered film composed of a nitride film and a non-nitride alloy film, has a composition defined by expression (8):

$$T_{\overline{X}} M_{\overline{Y}} N_{\overline{Z}} \ldots (8)$$

wherein $\overline{X}\ \overline{Y}\ \overline{Z}$ and $\overline{X}+\overline{Y}+\overline{Z}$ are defined by expression (9):

$$65 \leq \overline{X} \leq 94$$

$$5 \leq \overline{Y} \leq 25$$

$$0.1 \leq \overline{Z} \leq 20$$

$$\overline{X}+\overline{Y}+\overline{Z}=100 \qquad (9)$$

This compositionally modulated nitride film has a structure wherein the values of $\overline{X}$, $\overline{Y}$ and $\overline{Z}$ are not constant throughout the direction of the film thickness, but are modulated periodically. The average compositions of $\overline{X}$, $\overline{Z}$ and $\overline{Z}$ shown by expression (8) agree with the values of X, Y and Z given by expression (2) throughout the multilayered film.

As mentioned above, since the compositionally modulated film has a stable structure, interdiffusion hardly causes a change in characteristic. The compositionally modulated film has thermal stability, and furthermore, has a small coercive force, Hc. Moreover, by containing the elemental nitrogen (N) throughout the film, excellent wear resistance and comparatively high electric resistivity can be obtained.

A feature of the composite film of the present invention is that it is neither a single layered nitride alloy film nor a multilayered alloy film, but is a compositionally modulated magnetic nitride film, wherein the soft magnetism is thermally stable, and interdiffusion is hardly caused. The excellent soft magnetic property which has never been obtained by a single layered nitride film can thus be obtained by the compositionally modulated structure.

Hereinafter, in showing the composition of the compositionally modulated nitride film, an average composition is given, and therein the values of $\overline{X}$, $\overline{Y}$ and $\overline{Z}$ are periodically modulated in the direction of the film thickness. When a modulation wave length, λ, is defined by the modulation periodicity of the contents of the film, as λ decreases, the coercive force, Hc, of the compositionally modulated film decreases. Particularly, when the wave length, λ, is < 1000 Å, the above-mentioned effect is remarkable.

The present invention is made, based on the fact that in expression (8), the elements represented by M (Nb, Zr, Ti, Ta, Hf, Cr, W and Mo) form more a nitride more easily than do the elements represented by T (Fe, Co, Ni and Mn). The soft magnetic nitride compositionally modulated film having a small coercive force, Hc, and thermal stability is obtained by annealing a multilayered film using this tendency, wherein elemental nitrogen (N) is mainly compositionally modulated. Hereupon, the thermally stable film is a film which has a compositionally modulated depth profile wherein the contents of the M and N elements vary amost in phase, and the contents of the T element vary in an opposite phase because of the difference in the affinity between T-N and M-N. Those soft magnetic nitride films are thermally stable, and have a compositionally modulated depth profile. In those films, changes of the properties due to interdiffusion hardly occur. Thus, the soft magnetic nitride film having a small coercive force, Hc, which was not obtained in a single layered nitride film, is obtainable.

Moreover, in the compositionally modulated nitride film of the present invention, the deterioration of the characteristic is small, even at a high temperature, in comparison with an amorphous alloy film having a composition indicated by expression (7) which does not contain elemental nitrogen (N). The amorphous alloy not containing elemental nitrogen (N) is crystallized above the crystallization temperature, $T_X$, and as a result, the soft magnetic property thereof is lost and the coercive force, Hc, becomes larger than 10 Oe. The $T_X$ of the conventional amorphous alloy is 560° C–570° C. at highest, and the higher the value of $4\pi Ms$ is, the lower the $T_X$ becomes. Accordingly, when the manufacturing of a magnetic head using the amorphous alloy is intended, it is difficult to set the temperature of the production process above 500° C.

On the other hand, in the compositionally modulated nitride film of the present invention, after annealing at 600° C., the coercive force, Hc, is smaller than 5 Oe, and the thermal stability of the characteristic is excellent. The single layered nitride film (a non-compositionally modulated film) is also thermally stable, but the coercive force, Hc, is comparatively large, both before and after annealing. Therefore, the compositionally modulated nitride film of the present invention has a better magnetic property than the simple non-compositionally modulated nitride film. Moreover, since the magnetic nitride films of the present invention have the excellent wear resistance proper to a nitride, a higher electrical resistivity than that of conventional alloys, and a thermally stable soft magnetic characteristic, they are suitable for use as the core of a high frequency magnetic head or the like.

DESCRIPTION OF THE PREFERRED EMBODIMENTS

Example 1

Figure 1:
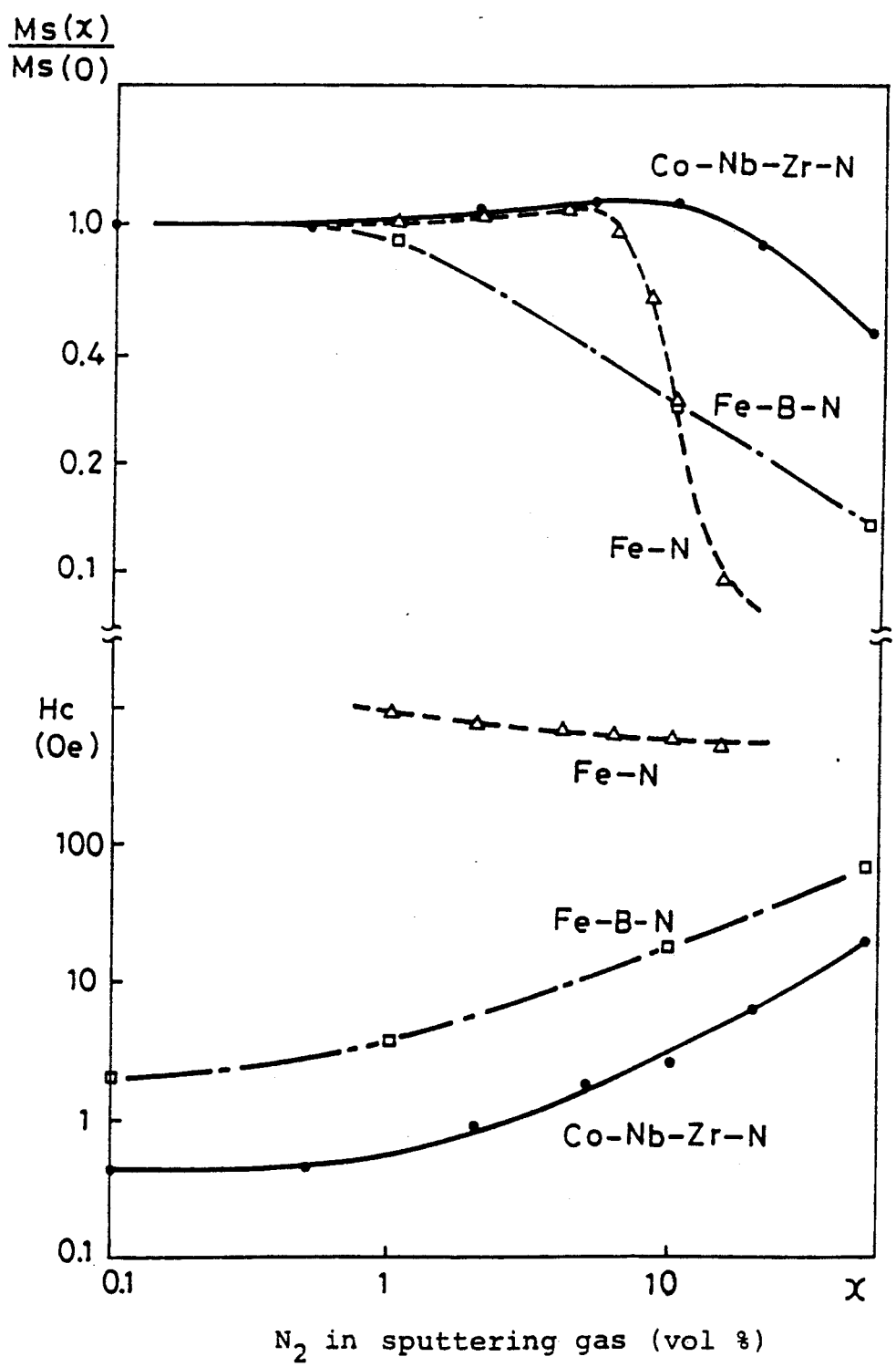
FIG. 1 is a diagram showing the relationship between saturation magnetization and the amount of $N_2$ in the sputtering gas and the relationship between the coercive force, Hc, and the amount of $N_2$ in the sputtering gas.

Nitride films, which were 1 μm thick, were made using the $N_2$ reactive sputtering method, wherein a target with a composition of $Co_{85}Nb_{10}Zr_5$ and a mixed gas of Ar and 0.1–50% $N_2$ were used. For comparison, comparative nitride films were made using the same sputtering method with two kinds of targets, Fe and $Fe_{80}B_{20}$. The characteristics of the nitride films of the present invention and the comparative nitride films are shown in FIG. 1. As clearly shown in FIG. 1, in the magnetic nitride Co-Nb-Zr-N film of the present invention, deterioration of the soft magnetism was comparatively small, even after nitriding thereof; and further, the value of $4\pi Ms$ did not decrease by nitriding, but showed a maximum at X=10%, and an increase in the value of $4\pi Ms$ was observed around X=10%.

Figure 2:
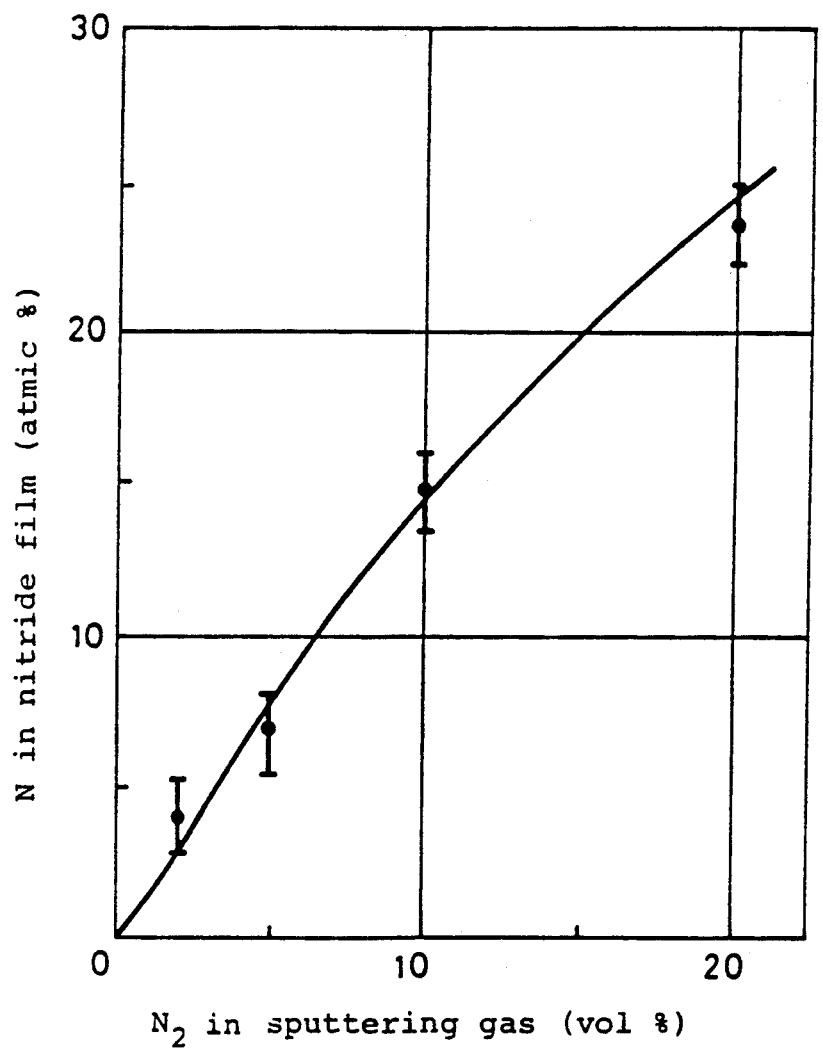
FIG. 2 is a diagram showing the relationship between the amount of $N_2$ in the sputtering gas and the atomic percent of elemental nitrogen (N) in a nitride film made using the sputtering method.

From FIG. 1 and FIG. 2 showing the results of the analysis, it was proved that in a nitride film containing elemental nitrogen (N) in an amount less than about 20%, the coercive force, Hc, was comparatively small and the value of $4\pi Ms$ did not decrease. Therefore, the nitride film of the present invention is a suitable soft magnetic material which may be used as a magnetic head.

On the other hand, in a metal-metalloid system, as shown in FIG. 1, the value of $4\pi Ms$ of Fe-B-N decreased comparatively quickly with nitriding, and furthermore, the coercive force, Hc, largely increased with nitriding, in comparison with the nitride Co-Nb-Zr-N film of the present invention. Moreover, in an iron nitride (Fe-N) film, the value of $4\pi Ms$ slightly increased for a certain range of elemental nitrogen (N) content in comparison with a non-nitride iron film, but the coercive force, Hc, was extremely large, and therefore, it was not a suitable soft magnetic material which could be used as a magnetic head.

Example 2

Multilayered films composed of Co-Nb-Zr film and Co-Nb-Zr-N film were made by using the same target as in Example 1. The films were prepared by sputtering, while introducing 10% $N_2$ gas into Ar gas periodically. By changing the sputtering period wherein $N_2$ gas was mixed in sputtering gas, the thickness, t, of the Co-Nb-Zr-N layer was varied. Furthermore, by setting the period of sputtering in the sputtering gas not containing $N_2$ gas to be equal to the period of sputtering in the sputtering gas containing $N_2$ gas, the thickness, t', of the non-nitride Co-Nb-Z layer was adjusted to be almost equal to the thickness, t, of the nitride layer (Co-Nb-Zn-N). (Strictly speaking, t', was slightly thicker than t.) Resultant multilayered films had a total thickness of about 12 μm. The thickness of the layer and the number of layers in the samples were as follows.

| Sample | t (Å) | t' (Å) | number of layers (n) |
|---|---|---|---|
| 1 | ab. 9500 | ab. 10500 | n = 12 |
| 2 | ab. 2800 | ab. 3200 | n = 40 |
| 3 | ab. 1000 | ab. 1000 | n = 120 |
| 4 | ab. 300 | ab. 300 | n = 400 |
| 5 | ab. 100 | ab. 100 | n = 1200 |

Figure 3:
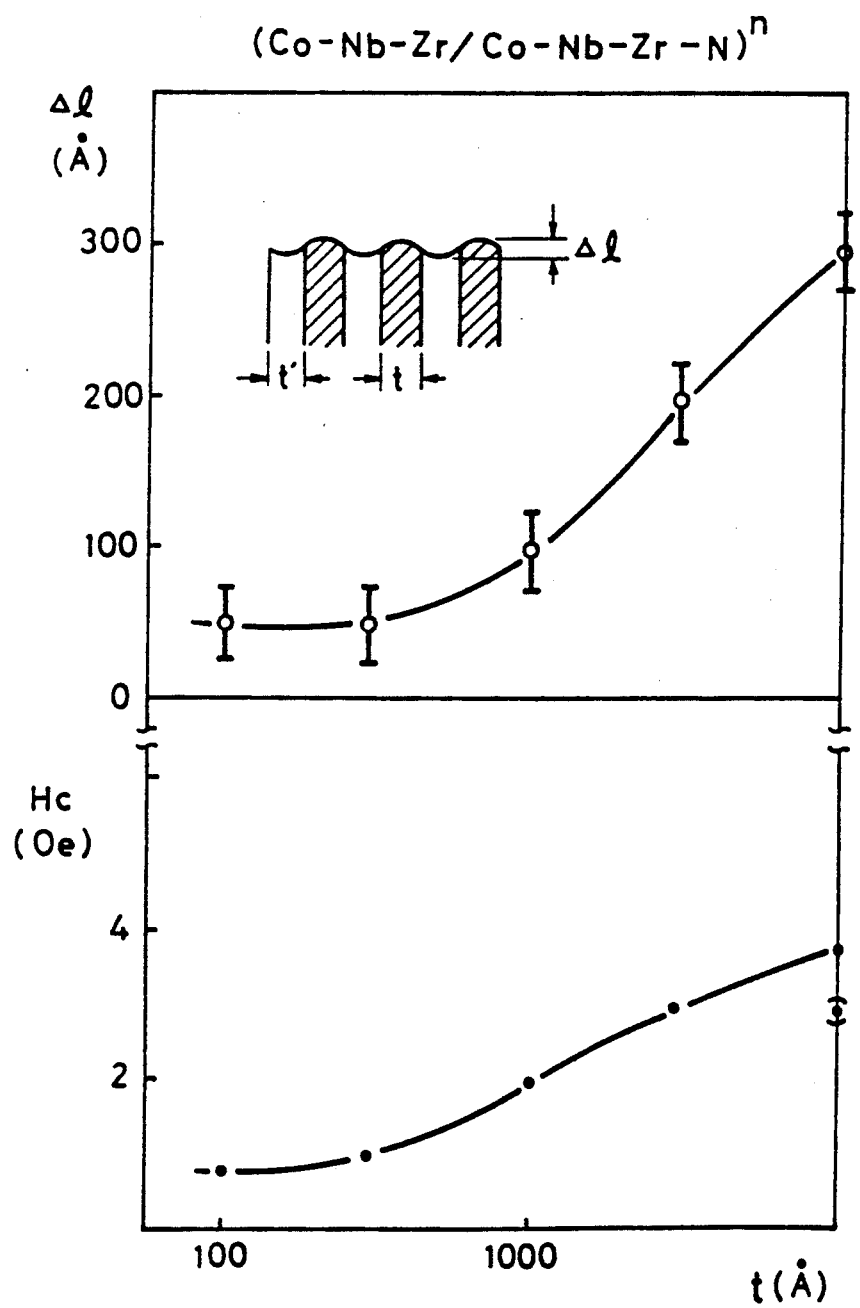
FIG. 3 is a diagram showing the relationship between the amount of partial wear, (Δl), of (Co-Nb-Zr/Co-Nb-Zr-N)$^n$ multilayered film and the layer thickness, and the relationship between the coercive force, Hc, and the layer thickness.

These multilayered films were sandwiched and bonded between substrates. They were mounted on a VTR deck so that the side face thereof contacted with tape. The amount of partial wear on the contact face was observed after the tape had run for a hundred hours on the surface of the sandwiched film. Since the nitride layer had higher wear resistance than that of the non-nitrified alloy layer, partial wear, Δ1, was observed as shown in FIG. 3. The partial wear, Δ1, shown in FIG. 3 is a function of the layer thickness, t. Moreover, the coercive force, Hc, of the multilayered film is also shown as a function of the layer thickness, t. From FIG. 3, it is proved that Δ1 and Hc decreased with a decrease of the layer thickness, t, and the degree of decrease thereof is remarkable when the thickness is $\leq 1000 Å$.

Example 3

Various magnetic nitride films were made by sputtering, wherein various alloy targets and various mixed gases (Ar+$N_2$) were used, and various characteristics thereof were compared. The magnetic nitride films were formed on a water-cooled glass substrate having a thermal expansion coefficient of about $120 \times 10^{-7}/°C$, with an input power of 350 W and a gas pressure of $1 \times 10^{-2}$ Torr, by using a radio frequency diode sputtering apparatus. The characteristics of those film are shown in Table 1.

As shown in Table 1, the hardness of the nitride films increased as the $N_2$ partial pressure rose, and furthermore, even when the $N_2$ partial pressure was 0.1%, the hardness thereof was improved.

| Composition of Target | $N_2$ Partial Pressure (%) | $4\pi Ms$ (Gauss) | Hc (Oe) | Hardness (Hv) | Resistance (μΩ cm) |
|---|---|---|---|---|---|
| $Co_{82}Fe_2Nb_{16}$ | 0 | 10000 | 0.1 | 800 | 130 |
|  | 0.1 | 10000 | 0.5 | 850 | 130 |
|  | 2 | 10800 | 2 | 900 | 200 |
|  | 10 | 11200 | 4 | 920 | 600 |
| $Co_{80}Ti_{20}$ | 0 | 7000 | 0.1 | 750 | 120 |
|  | 2 | 8000 | 2 | 850 | 180 |
|  | 10 | 8600 | 4 | 880 | 500 |
| $Co_{85}Ta_{15}$ | 0 | 8000 | 0.5 | 780 | 130 |
|  | 2 | 8800 | 3 | 880 | 200 |
|  | 10 | 9200 | 6 | 900 | 600 |
| $Co_{82}Nb_{12}Zr_6$ | 0 | 8000 | 0.05 | 850 | 130 |
|  | 0.1 | 8000 | 0.2 | 900 | 130 |
|  | 2 | 9100 | 1 | 950 | 300 |
|  | 10 | 9600 | 3 | 980 | 900 |
| $Co_{80}Mn_3Nb_{17}$ | 0 | 9500 | 0.1 | 800 | 130 |
|  | 2 | 10200 | 2 | 900 | 200 |
|  | 10 | 10500 | 4 | 920 | 600 |
| $Co_{80}W_{10}Zr_{10}$ | 0 | 6800 | 0.05 | 850 | 140 |
|  | 2 | 7200 | 1 | 940 | 250 |
|  | 10 | 7400 | 3 | 980 | 800 |
| $Fe_{88}Si_{12}$ | 0 | 18000 | 4 | — | 70 |
|  | 0.1 | 17000 | 20 | — | 100 |
|  | 5 | 9000 | 100 | — | 200 |
| $Fe_{78}Si_{10}B_{12}$ | 0 | 14000 | 1 | 910 | 140 |
|  | 2 | 10000 | 5 | 1000 | 200 |
|  | 10 | 5000 | 20 | 1000 | 900 |
| $Co_{75}Si_{15}B_{10}$ | 0 | 7800 | 0.05 | 910 | 140 |
|  | 2 | 7500 | 3 | 1050 | 200 |
|  | 10 | 6000 | 8 | 1050 | 800 |
| Fe | 0 | 22000 | 10 | — | 10 |
|  | 2 | 24000 | 700 | — | 100 |
|  | 10 | 7000 | 600 | — | 800 |

Example 4

Multilayered nitride films having four hundred layers and a total thickness of 12 μm, were prepared by alternately sputtering at regular intervals two kinds of sputtering gases, i.e., 10% $N_2$ mixed with Ar gas and pure Ar gas, thereby forming alternately laminated nitride film and non-nitride film, each having a thickness of about 300 Å. Four hundred (400) layers in total were thus laminated (200 layers of nitride film and 200 layers of non-nitride film). The same test described in Example 2 was then performed on the multilayered film. And the results thereof are shown in Table 2.

TABLE 2

| | Hc (Oe) | | | Wear Amount, l (μm) | | Partial Wear Amount, Δl (Å) |
|---|---|---|---|---|---|---|
| | Single Layered Film | | Multi-Layered Film | Single Layered Film | Multi-Layered Film | |
| Target | $N_2 = 0$ | $N_2 = 10\%$ | | $N_2 = 0$ | | |
| $Co_{82}Fe_2Nb_{16}$ | 0.1 | 4 | 1 | 10 | ab. 3 | ab. 80 |
| $Co_{82}Nb_{12}Zr_6$ | 0.05 | 3 | 1 | 6 | ab. 2 | ab. 50 |
| $Co_{80}W_{10}Zr_{10}$ | 0.05 | 3 | 1 | 8 | ab. 2 | ab. 50 |

In Table 2, the single layered film represents a film made using only a single sputtering gas of 10% $N_2$ mixed with Ar gas, or pure Ar gas. The single layered film has a thickness of 12 μm. The wear amount represents the total amount of wear observed after 100 hours of running the tape. The partial wear amount represents the wear produced between a nitride film layer and a non-nitride film layer. As shown in Table 2, the coercive force, Hc, of the m#, it is proved that the characteristics of the magnetic nitride film were improved by forming the multilayered structure.

Example 5

A multilayered film, in which nitride film layers and non-nitride film layers were periodically laminated, was formed on a ferrite substrate by using a target having a composition of $Co_{83}Nb_{17}$ (atomic %), and sputtering using $N_2$ mixed with Ar. The $N_2$ gas content in the Ar gas was varied according t the following predetermined partial pressures: 0.2%, 5%, 10%, 20% and 40%. The nitride film layers and the non-nitride film layers were either 1000 Å, 250 Å and 125 Å thick, and the thickness of the nitride and the non-nitride film layers were almost the same. As a typical example, a depth profile (measured by AES) of the multilayered film composed of nitride layers formed under a partial pressure of 5% $N_2$ gas and non-nitride layers with a layer thickness of about 250 Å is shown in FIG. 5(a).

Figure 4:
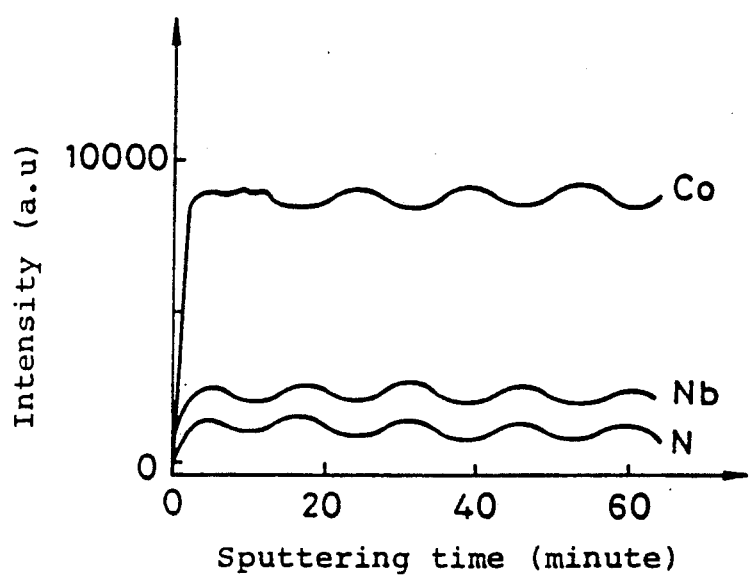
FIG. 4(a) and FIG. 4(b) are diagrams showing depth profiles of the compositionally modulated nitride film of the present invention.
Figure 4:
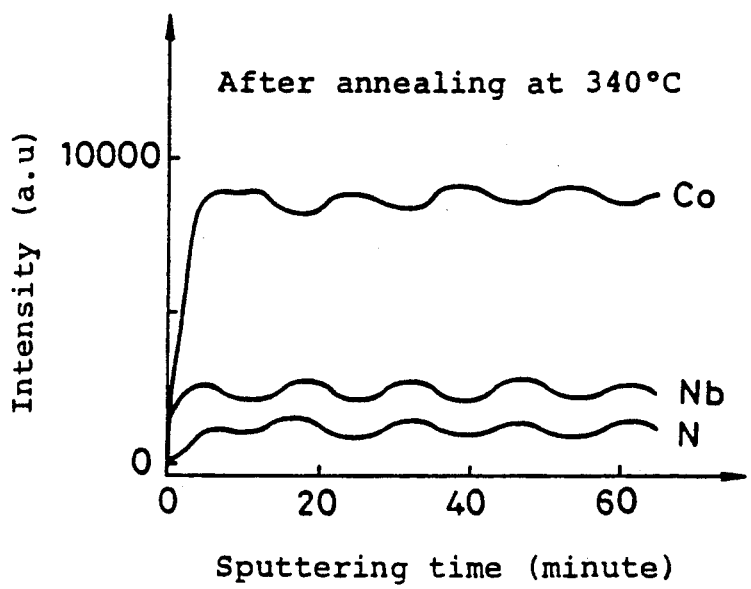
Figure 5A:
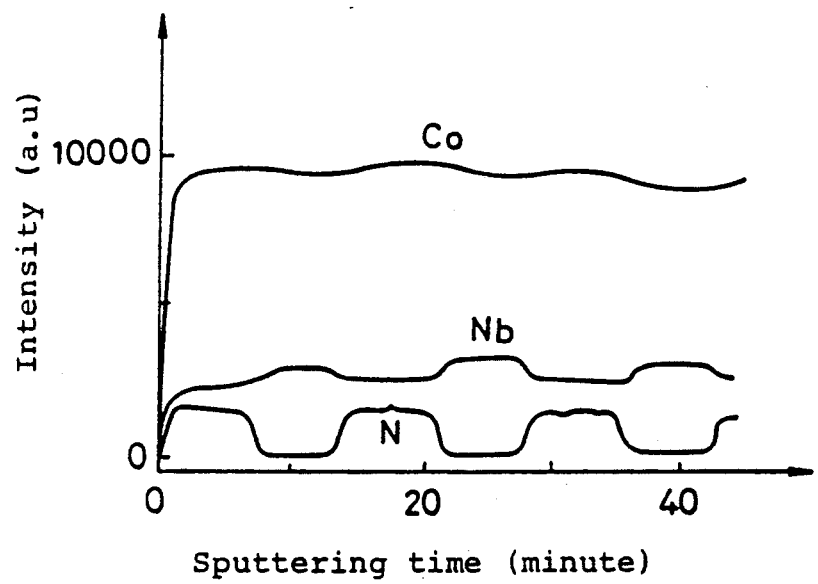
FIG. 5(a) and FIG. 5(b) are diagrams showing depth profiles measured by Auger electron spectroscopy.

FIG. 5 clearly shows that the multilayered structure was formed by the nitride layers and the non-nitride layers in the above-mentioned example. Then, multilayered nitride films obtained in this way were annealed in a vacuum at 480° C., thereby obtaining the compositionally modulated nitride film of the present invention. As a typical example, the depth profile (measured by AES) of the compositionally modulated film obtained by annealing the multilayered film of FIG. 5(a) is shown in FIG. 4(a). From FIG. 4(a) and FIG. 5(a), it is clear that, although before the annealing, the multilayered film showed a compositional profile wherein the Nb content was small and the Co content was comparatively large in the nitride layer, and on the other hand, in the non-nitride layer, the Nb content was comparatively large and the Co content was small; after annealing, the multilayered film showed a compositionally modulated depth profile wherein the clear distinction between the nitride layer and the non-nitride layer was eliminated by the interdiffusion of elemental nitrogen (N), and the elemental nitrogen (N) and Nb contents varied almost in phase and the Co content varied in an opposite phase. That is, the compositionally modulated depth profile shows different inclinations before and after annealing. The reason for the above-mentioned phenomenon is as follows: the Nb content was apt to decrease with sputtering which used a mixed gas of $N_2$ and Ar as the sputtering gas, as compared with sputtering which used only Ar gas, but Nb was more liable to form a nitride compared with Co; therefore, compositional modulation formed due to annealing at the proper temperature.

For comparison, simple nitride films (noncompositionally modulated films) were also made by sputtering with $N_2$ mixed gas under the condition that the partial pressure of $N_2$ was 5%, 10% and 20%. The multilayered film, the compositionally modulated nitride film and the simple nitride films (single-layer film and multilayered film) which were obtained according to the above description were annealed at a temperature of 340° C. in a rotation magnetic field.

The changes in the properties of these films before and after annealing are shown in Table 3.

TABLE 3

| | | | | Hc (Oe) | |
|---|---|---|---|---|---|
| Sample | Sample Profile | $N_2$ Partial Pressure (%) | Compositional Modulation Wave Length (Å) | As Prepared | After Annealing 340° C. |
| a | Multilayered film | 0.2 | 2000 | 0.5 | 1 |
| b | Multilayered film | " | 500 | 0.2 | 0.5 |
| c | Multilayered film | 5 | 2000 | 3 | 12 |
| d | Multilayered film | " | 500 | 2 | 8 |
| e | Multilayered film | " | 250 | 0.5 | 6 |
| f | Multilayered film | 10 | 2000 | 3 | 12 |
| g | Multilayered film | " | 500 | 1 | 8 |
| h | Multilayered film | " | 250 | 1 | 10 |
| i | Multilayered film | 20 | 2000 | 4 | 14 |
| j | Multilayered film | " | 500 | 2 | 12 |
| k | Multilayered film | 40 | 2000 | 5 | 15 |
| l | Multilayered film | " | 500 | 3 | 13 |
| a' | Compositionally modulated film | 0.2 | 2000 | 0.5 | 0.5 |
| b' | Compositionally modulated film | " | 500 | 0.2 | 0.4 |
| c' | Compositionally modulated film | 5 | 2000 | 3 | 3 |
| d' | Compositionally modulated film | " | 500 | 2 | 2 |
| e' | Compositionally | " | 250 | 1 | 1 |

TABLE 3-continued

| Sample | Sample Profile | N₂ Partial Pressure (%) | Compositional Modulation Wave Length (Å) | Hc (Oe) As Prepared | Hc (Oe) After Annealing 340° C. |
|---|---|---|---|---|---|
| f' | Compositionally modulated film | 10 | 2000 | 4 | 4 |
| g' | Compositionally modulated film | " | 500 | 2 | 2 |
| h' | Compositionally modulated film | " | 250 | 2 | 2 |
| i' | Compositionally modulated film | 20 | 2000 | 5 | 5 |
| j' | Compositionally modulated film | " | 500 | 3 | 3 |
| k' | Compositionally modulated film | 40 | 2000 | 6 | 6 |
| l' | Compositionally modulated film | " | 500 | 4 | 4 |
| l | Single Layered nitride film | 5 | — | 8 | 10 |
| m | Single Layered nitride film | 10 | — | 10 | 12 |
| o | Single Layered nitride film | 20 | — | 13 | 15 |

Figure 5B:
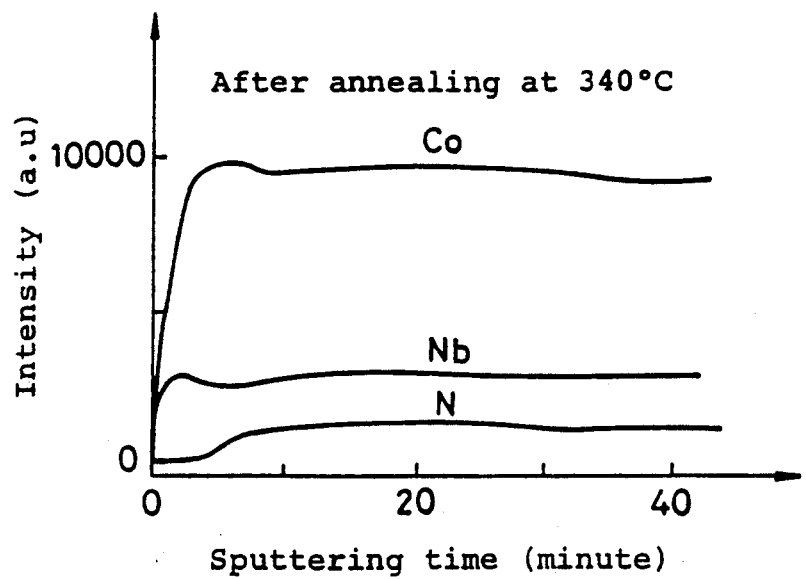

As shown in Table 3, the magnetic characteristic of the compositionally modulated nitride film is stable even after annealing at 340° C., in comparison with the non-compositionally modulated multilayered film. This is because the depth profile of the compositionally modulated nitride does not change due to annealing at 340° C., while that of the multilayered film does change. For reference, the depth profiles of both films after annealing at 340° C. are shown in FIG. 4(b) and FIG. 5(b). Although the characteristic of the simple nitride film is thermally stable, it does not show a soft magnetic property.

Although the N₂ partial pressure and the content of elemental nitrogen (N) in the nitride film were not necessarily in a proportional relation, according to AES analysis, when the N₂ partial pressure was 20%, the content of elemental nitrogen (N) in the nitride film was about 20%. The compositionally modulated nitride shown in Table 3 was obtained by high-temperature-annealing of a multilayered film, wherein the ratio of the thickness of the nitride film layer and the non-nitride film layer was 1:1. The average content of elemental nitrogen (N) of samples k' and l' were about 20%. When the content of elemental nitrogen (N) was more than 20%, the nitride film easily exfoliated from the substrate, and the value of 4λMs decreased, and therefore, this film was of no practical use. Moreover, as shown in Table 3, the shorter the compositional modulation wave length, λ, became, the smaller the coercive force, Hc, became. Therefore, it is preferable that the λ is less than 1000 Å.

Example 6

A conventional Co-Nb amorphous alloy film was prepared by sputtering in pure Ar, using the same target as that of Example 5. The hardness and electric resistivity of this amorphous alloy film were measured, and the results are shown in Table 4, together with those of the compositionally modulated nitride film prepared in the Example 5.

TABLE 4

| Sample | Sample Profile | N₂ Partial Pressure (%) | Conductivity (μΩ/cm) | Hardness (Hv) | Ratio of Amount of Wear |
|---|---|---|---|---|---|
| p | Non-compositionally modulated amorphous alloy film | 0 | 110 | 700 | 1 |
| b' | Compositionally modulated nitride film | 0.2 | 120 | 750 | 0.8 |
| d' | Compositionally modulated nitride film | 5 | 140 | 750 | 0.5 |
| g' | Compositionally modulated nitride film | 10 | 170 | 800 | 0.4 |
| j' | Compositionally modulated nitride film | 20 | 200 | 800 | 0.3 |
| l' | Compositionally modulated nitride film | 40 | 280 | 850 | 0.3 |

The nitride film was prepared on the top surface of a head chip-shaped substrate, and then mounted on a commercial VTR deck. A tape was run on the nitride film for five hundred hours, and thereafter, the amount of wear was observed. Table 4 shows the ratio of the amount of wear of the compositionally modulated nitride film to that of a simple amorphous film.

As shown in Table 4, the compositionally modulated nitride films of the present invention were harder, and had greater electric resistivity and wear resistance than the conventional non-nitride amorphous film. Although the multilayered film composed of a nitride film and a non-nitride film had better wear resistance than the conventional non-nitride amorphous film, there was a problem in the generation of partial wear, since there was a difference between the wear resistances of the nitride layer and the non-nitride layer. On the other hand, in the compositionally modulated nitride film, partial wear hardly occurred.

Example 7

Using various kinds of targets, various compositionally modulated nitride films were prepared in the same way as in Example 5. The characteristics of the compositionally modulated nitride films are shown in Table 5.

TABLE 5

| Sample No. | Average Composition | Compositional Modulation Wave Length (Å) | $4\pi Ms$ (Gauss) | Hc (Oe) Before Annealing | Hc (Oe) After Annealing at 340° C. |
|---|---|---|---|---|---|
| 1 | $Co_{94}Zr_5N_1$ | 500 | 15500 | 2.5 | 2.5 |
| 2 | $Co_{90}Nb_5Hf_3N_2$ | 500 | 14000 | 1.0 | 1.0 |
| 3 | $Co_{88}Ta_6Zr_3N_3$ | 500 | 13000 | 1.5 | 1.5 |
| 4 | $Co_{85}Nb_8Zr_4N_3$ | 500 | 12000 | 0.6 | 0.6 |
| 5 | $Co_{80}Nb_8Ti_8N_4$ | 250 | 11000 | 0.4 | 0.4 |
| 6 | $Co_{76}W_8Zr_8N_8$ | 500 | 10000 | 1.5 | 1.5 |
| 7 | $Co_{76}Mo_4Cr_4Zr_8N_8$ | 500 | 10000 | 3.5 | 4.0 |
| 8 | $Co_{70}Fe_2Nb_{20}N_8$ | 250 | 8000 | 1.5 | 1.5 |
| 9 | $Co_{70}Mn_3Nb_{19}N_8$ | 250 | 8500 | 1.5 | 1.5 |
| 10 | $Co_{68}Ta_{12}Hf_8N_{12}$ | 250 | 7500 | 2.0 | 2.0 |
| 11 | $Co_{64}Ni_{10}Zr_{10}N_{16}$ | 500 | 7500 | 3.0 | 3.0 |
| 12 | $Co_{65}Ta_{10}Zr_5N_{20}$ | 250 | 7000 | 4.0 | 4.0 |

As shown in Table 5, in the compositionally modulated nitride film, the value of $4\pi Ms$ was large and the soft magnetic characteristic was thermally stable.

Example 8

Figure 6A:
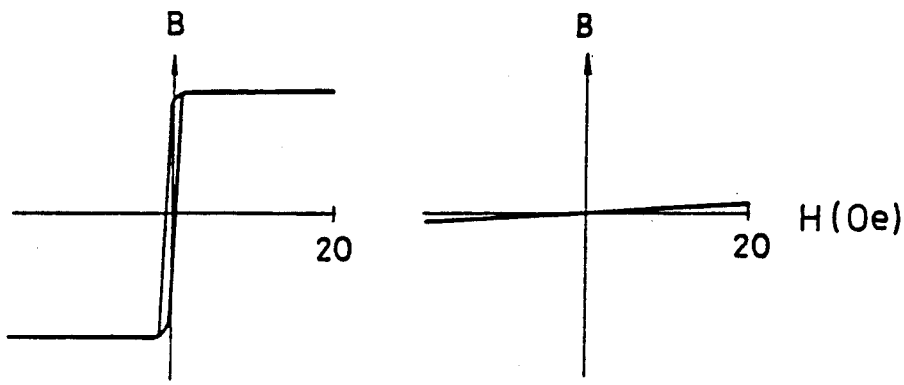
FIG. 6(a), FIG. 6(b) and FIG. 6(c) are diagrams showing the B-H loops of an amorphous alloy film, a compositionally modulated nitride film and a nitride alloy film measured before and after annealing at 620° C.
Figure 6B:
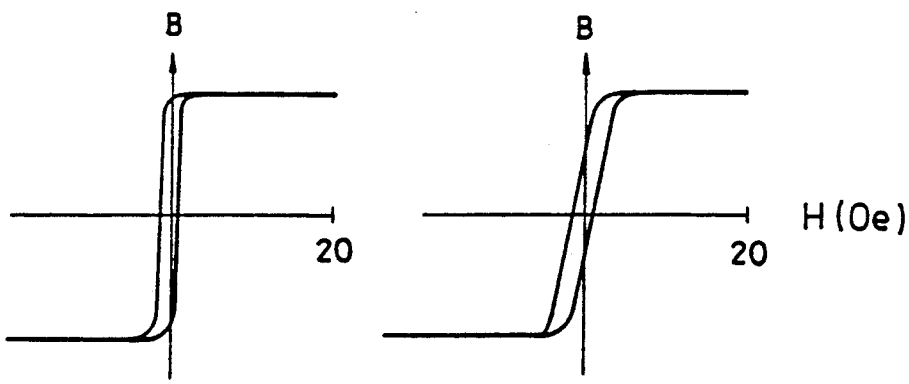
Figure 6C:
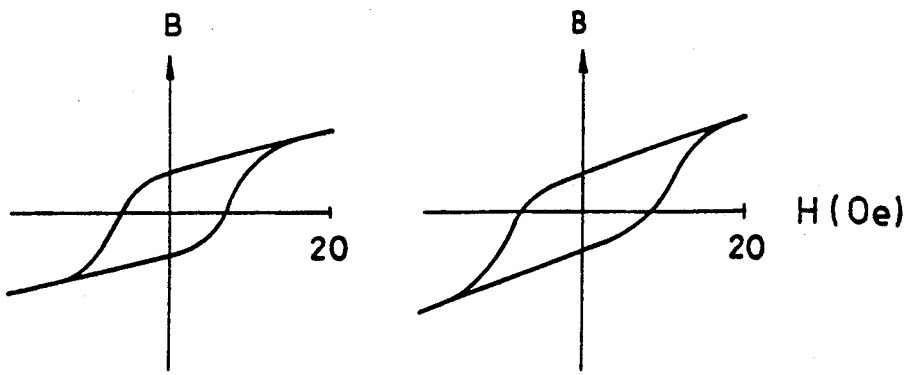

Using $Co_{82}Nb_{12}Ta_2Zr_4$ alloy as the target, a compositionally modulated nitride film, wherein the average content of elemental nitrogen (N) was 5% and the compositional modulation wave length, λ, was 500 Å, was manufactured in the same manner as in Example 5. For reference, using the same target, an amorphous alloy film was manufactured by sputtering with pure Ar gas, and a nitride film was manufactured by sputtering with Ar gas containing 5% $N_2$. Those samples were annealed in a vacuum at 620° C. for thirty minutes, following which the stability of the respective magnetic characteristics was examined. B-H loops in 60 Hz measured before and after annealing are shown in FIG. 6. In FIG. 6, (a), (b) and (c) show the B-H loops of the non-nitride amorphous film, the compositionally modulated nitride film and the single layered nitride film, respectively. As shown in FIG. 6(a), the non-nitride amorphous film lost the soft magnetic property with annealing, since the non-nitride amorphous film was completely crystallized by annealing. For the single layered nitride film (c) in FIG. 6, deterioration of the characteristic due to annealing was small, but there was the problem of the large coercive force, Hc. On the other hand, as shown in FIG. 6(b), in the case of the compositionally modulated nitride film, the soft magnetism was maintained after the annealing, and it was found that the property was thermally stable.

As mentioned above, though the magnetic nitride film of the present invention is of a nitride composition, the deterioration of saturation magnetization is small, and furthermore, there are some cases where the saturation magnetization increases. Moreover, the magnetic nitride film of the present invention is superior in the thermal stability of the characteristic over the conventional amorphous alloy, and has both a high wear resistance and the high electric resistivity proper to the nitride. Particularly, the compositionally modulated nitride film shows the soft magnetic property and high thermal stability. Therefore, the magnetic nitride films of the present invention are suitable for use as a core material of magnetic head or the like.

We claim:

1. A soft magnetic nitride film, on a substrate, consisting of a composition having formula:

$$T_XM_YN_Z$$

wherein
T is at least one metal selected from the group consisting of Fe, Co, Ni and Mn;
M is at least one metal selected from the group consisting of Nb, Zr, Ti, Ta, Hf, W and Mo;
N is nitrogen (N), and
X, Y and Z show atomic percent of said T, M and N, and values of X, Y and Z are defined by the following expressions $$75 \leq X < 94,$$

$$6 \leq Y < 25,$$

$$0.1 \leq Z < 20 \text{ and}$$

$$X + Y + Z = 100.$$

* * * * *